June 11, 1935.  J. G. HOEFLICH  2,004,627
SELF SUPPORTING THERMOMETER
Filed Dec. 22, 1930  2 Sheets-Sheet 2
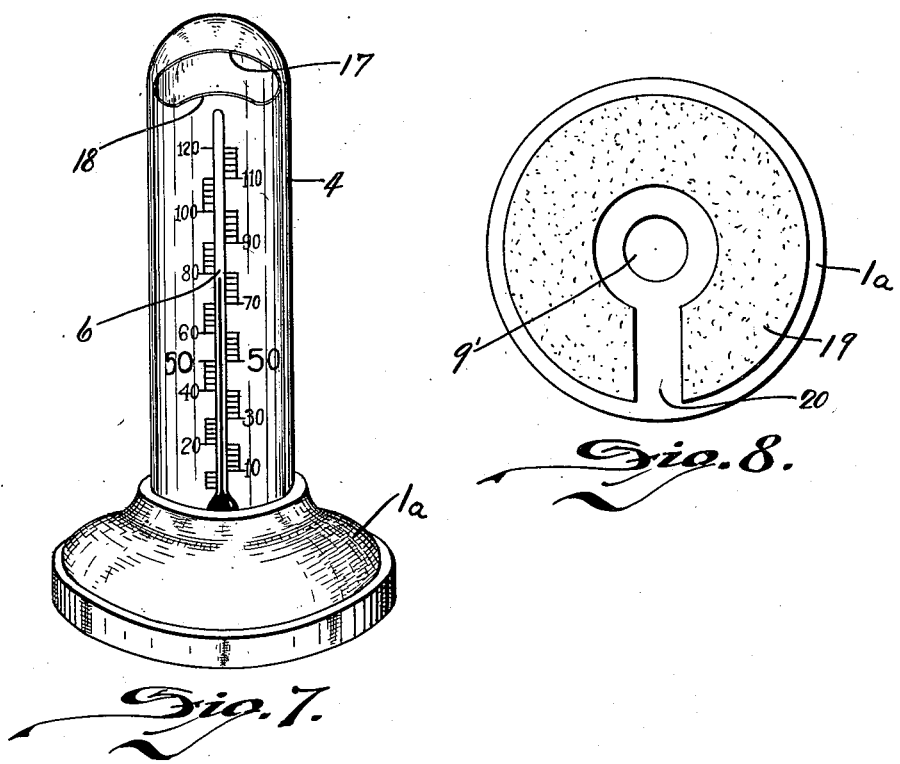

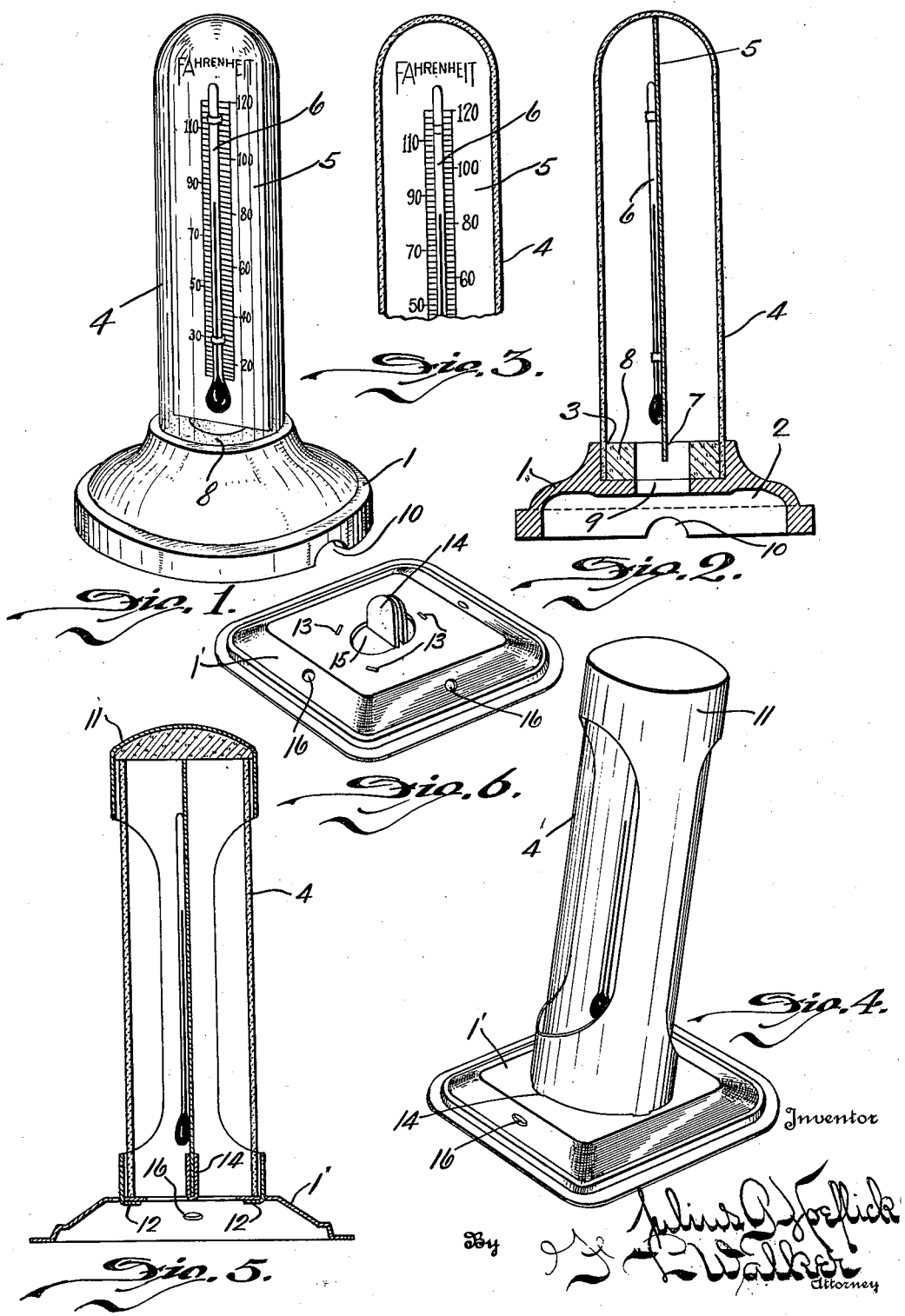

Patented June 11, 1935

2,004,627

UNITED STATES PATENT OFFICE 2,004,627

SELF-SUPPORTING THERMOMETER

Julius G. Hoeflich, Springfield, Ohio, assignor to The Chaney Manufacturing Company, Springfield, Ohio, a corporation of Ohio Application December 22, 1930, Serial No. 504,036

5 Claims. (Cl. 73—52)

My invention relates to thermometers of the self-supporting or table type, and more particularly to a supporting pedestal and enclosure within which the thermometer tube and scale are mounted.

The thermometer device forming the subject matter hereof comprises a supporting base from which arises a tubular glass housing closed at its upper end and within which is disposed the thermometer tube and graduated back or scale. The thermometer back or scale may be cylindrical and of a size to closely fit within the tubular glass housing, but is preferably flat and is disposed in a diametrical plane of the glass housing. The lower end of such back is engaged within a slot within an upwardly projecting portion of the base or within a plug in the lower end of the tubular glass housing, while the upper end of such back is shaped to conform to the closed end of the tubular glass housing by which it is located and held in a central plane. The supporting base is provided with a ventilating orifice communicating with the interior of the glass housing, and one or more air passages lead beneath the base to such orifice thereby connecting the interior of the tubular glass housing with atmosphere.

The object of the invention is to provide a self-supporting or table type of thermometer, wherein the thermometer tube and scale will be protected by an enclosing glass housing which will not be unsightly in appearance, but will protect the thermometer tube against breakage and which will not interfer with the influence of temperature fluctuation upon the thermometer tube.

A further object of the invention is to provide such protected table type of thermometer which will not only be simple in construction and economical to manufacture, but will be of increased durability and efficiency, capable of being easily and quickly assembled and unlikely to get out of repair.

A further object of the invention is to provide a protected table type of thermometer, having unobstructed communication with atmosphere whereby the thermometer tube will be readily influenced by thermal changes, without, however, being subject to violent fluctuation.

A further object of the invention is to provide improved means for mounting the thermometer back or scale carrying the thermometer tube within a glass housing.

A further object of the invention is to provide improved means for interconnecting the thermometer back with the base of the pedestal or support.

With the above primary and other incidental objects in view as will more fully appear in the specification, the invention consists of the features of construction, the parts and combinations thereof and the mode of operation, or their equivalents, as hereinafter described and set forth in the claims.

Referring to the accompanying drawings wherein is shown the preferred but obviously not necessarily the only form of the embodiment of the invention, Fig. 1 is a perspective view of the preferred form of the protected self-supporting thermometer forming the subject matter hereof. Fig. 2 is a vertical sectional view thereof. Fig. 3 is a detail sectional view of a portion of the enclosing and protecting housing substantially in the plane of the thermometer back. Fig. 4 is a perspective view of a modification of an assembled self-supporting thermometer also embodying the fundamental features of the invention. Fig. 5 is a vertical sectional view of the construction illustrated in Fig. 4. Fig. 6 is a perspective view of the supporting base of the structure illustrated in Figs. 4 and 5 separated from the thermometer back and the housing.

Fig. 7 is a perspective view of a thermometer housing or pedestal similar to that illustrated in Fig. 1, but enclosing a thermometer back or scale of cylindrical form indented at one side sufficiently to accommodate the thermometer tube. Fig. 8 is a bottom plan view of a modification of the supporting base showing the ventilating or air inlet orifice and the passage leading thereto.

Like parts are indicated by similar characters of reference throughout the several views.

Referring to the accompanying drawings, 1 is the supporting base which may be formed of any suitable shape and proportion and of any suitable material. In the commercial devices manufactured in accordance with the present invention, this base 1 is of circular form and of substantially ogee contour. The base 1, as illustrated in Figs. 1 and 7, may be turned from wood but is preferably molded from plastic molding material such as phenolic condensation material or synthetic resins or the like. Fig. 2 illustrates a typical form of molded base 1. Such base is formed with a recess or bottom cavity 2, and with a circular socket 3 in its upper surface. Seated within the socket 3, in the upper face of the base 1, is a cylindrical tubular housing 4 of glass or other transparent material which is closed at its upper end. The closed upper end is preferably though not necessarily of substantially semi-spherical formation. Enclosed within the upright cylindrical glass housing 4, is the graduated thermometer back 5 to which is attached the usual thermometer tube 6. The width of the thermometer back 5 is substantially equal to the interior diameter of the glass tubular housing 4, and the back 5 occupies a diametrical plane within the housing. The lower end of the graduated back 5 is seated in a transverse slot 7 in a plug 8 located concentrically within the socket 3 and projecting within the lower open end of the tubular glass housing 4. This plug 8 may be an integral portion of the base 1 or it may be formed independently of the base for engagement in the open end of the tubular housing 4 prior to the seating of the latter within the socket 3. In either event the slotted plug performs the same function of holding the thermometer back 5 whether it be an independent portion or integral with the base 1. The opposite end of the thermometer back 5 is rounded to agree with the interior contour of the closed end of the tubular glass housing 4. The back 5 being substantially equal in width to the diameter of the tubular housing and its end being rounded to agree with the closed end of such housing, the thermometer back will automatically locate itself within the glass enclosure and will assume therein a position in a substantially diametrical plane. This is effected by the abutting contact of the rounded end of the thermometer back upon the correspondingly contoured end wall of the housing.

If the thermometer was to be enclosed within the housing 4 without communication to atmosphere, the dead air space thus formed would to some extent thermally insulate the thermometer tube 6 which would not readily respond to temperature change. There is provided, however, a ventilating opening 9 through the base 1 and the plug 8, through which the interior of the protective glass housing 4 communicates with the bottom recess or cavity 2 of the base 1. The margin of the base 1 is indented or notched as at 10, thereby interconnecting the bottom recess 2 with atmosphere. Thus the interior of the protective glass housing 4 is connected with atmosphere through the opening 9, base chamber 2 and notches 10 so that thermal changes of the surrounding air are quickly and directly transmitted to the thermometer tube 6.

In Fig. 4 there is shown a modification wherein the base 1' is formed from sheet metal. The tubular glass housing 4', in this embodiment, is enclosed within a metallic casing 11 interlocked with the base 1' by tongues 12 projected through openings 13 in the base and clinched thereunder. Obviously the casing might be soldered, welded or otherwise attached. The casing 11 is cut away at its side throughout the greater portion of its length to expose to view the tubular glass housing 4 and the thermometer back and tube contained therein. The upper end of the casing 11 is preferably though not necessarily closed, thereby obviating the necessity for forming the upper end of the tubular glass housing 4' with an integral closure end.

The base 1' of the construction illustrated in Figs. 4 to 6 inclusive, includes an upwardly extending projection comprising two parallel spaced tongues 14 struck from the material of the base 1' and projecting upwardly within the lower end of the tubular glass housing 4' to receive therebetween the lower end of the thermometer back 5. The spaced upstanding tongues 14 afford a projection integral with the base 1' which extends within the tubular glass housing 4 and performs the function of the slotted plug 8 in supporting the thermometer back. In this embodiment the interior of the protective glass housing 4', communicates with atmosphere through the openings 15 in the base 1' from which the tongues 14 were struck, and thence through the bottom recess or cavity within the hollow base 1' and opening 16 therein to atmosphere.

In Fig. 7 there is illustrated a thermometer back 17 of cylindrical shape, formed from flexible material such as paper. This thermometer back fits within the tubular glass housing 4 conforming to the cylindrical walls thereof except at one side where the tubular back 17 is longitudinally indented as at 18 to accommodate the thermometer tube 6. In the event that the base 1a is of wood or otherwise formed as a solid body, it is provided with a central hole 9' as shown in Fig. 8, and upon the bottom of the base 1a, there is secured a felt or other cover 19 of annular shape and having a wide split 20 at one side. This split 20 in the bottom covering of the base 1a, affords an air passage leading from the exterior of the base beneath the base and interiorly of the annular cover stratum 19 from which the hole 9' leads through the base to the interior of the protective glass housing 4.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modification within the legitimate and valid scope of the appended claims.

Having thus described my invention, I claim:

1. In a thermometer, a base of substantially ogee form having in its top a socket to receive a cylindrical glass tube, the bottom of the base being recessed, an intercommunicating orifice between the recess in the bottom of the base and the socket, said base having an aperture connecting the recess of the base with atmosphere, a tubular glass housing seated in the socket, a graduated thermometer back enclosed within the housing and a thermometer tube carried thereby.

2. In a thermometer, a base of substantially ogee form having in its top a socket to receive a tubular glass housing, a glass housing seated in said socket, an orifice in said base communicating with the interior of the glass housing, an air passage in the base leading to the orifice, a graduated thermometer back confined within the housing, and a thermometer tube carried by the back.

3. In a thermometer, a circular base of substantially ogee form having in its top a socket to receive a tubular glass housing, an upright tubular glass housing seated in said socket, a chamber in said base communicating with the interior of the glass housing, the base having a vent therein leading from the exterior of the base to the chamber, a graduated thermometer back confined within the housing and a thermometer tube carried by the back.

4. A thermometer assembly including a support having a disc-like body portion and a pair of hollow concentrically arranged cylindrical portions, one within the other and cooperating to form a circular channel, at least one of said cylindrical portions being integral with the disc-like body portion and the other portion fixedly carried thereby, said support having a vent for circulation of air, a test tube-like glass housing having the mouth thereof seated in the circular channel and a graduated thermometer back enclosed within the glass housing and arranged in a diametrical plane thereof and a thermometer tube secured to the back.

5. A thermometer assembly comprising an enclosure including a support having a disc-like body portion and a pair of cylindrical portions at least one of which is hollow and radially arranged with respect to the other so as to form a circular channel, at least one of the cylindrical portions being integral with the disc-like body portion, the other portion fixedly carried thereby, and a test tube-like glass housing having the open end thereof seated in the circular channel, and a thermometer mounted within the enclosure and including a graduated back located in a diametrical plane of the housing.

JULIUS G. HOEFLICH.